US 7,815,997 B2

(12) United States Patent
Reuter

(10) Patent No.: US 7,815,997 B2
(45) Date of Patent: *Oct. 19, 2010

(54) WINDOW FILM ASSEMBLY AND METHOD OF INSTALLING

(75) Inventor: Robert J Reuter, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 446 days.

This patent is subject to a terminal disclaimer.

(21) Appl. No.: 11/618,001

(22) Filed: Dec. 29, 2006

(65) Prior Publication Data

US 2008/0160241 A1 Jul. 3, 2008

(51) Int. Cl.
*B32B 27/00* (2006.01)

(52) U.S. Cl. .................. 428/212; 428/192; 428/38; 52/202; 52/203

(58) Field of Classification Search ................. 428/212, 428/192, 38; 52/202, 203
See application file for complete search history.

(56) References Cited

U.S. PATENT DOCUMENTS

| | | | |
|---|---|---|---|
| 1,777,435 A | 10/1930 | Hogelund |
| 2,046,362 A | 7/1936 | Baldwin |
| 2,111,343 A | 3/1938 | Walz |
| 2,238,073 A | 4/1941 | Patten |
| 2,960,734 A | 11/1960 | Collins |
| 3,312,023 A | 4/1967 | Salomon |
| 3,420,728 A | 1/1969 | Haverstock |
| 3,429,006 A | 2/1969 | Mattimoe et al. |
| 3,939,620 A | 2/1976 | Bero |
| 3,990,635 A | 11/1976 | Algaier et al. |
| 4,075,386 A | 2/1978 | Willdorf |
| 4,075,802 A | 2/1978 | Gross et al. |
| 4,095,013 A | 6/1978 | Burger et al. |
| 4,103,728 A | 8/1978 | Burdette et al. |
| 4,157,417 A | 6/1979 | Murphy et al. |
| 4,160,348 A | 7/1979 | Chapman et al. |
| 4,182,088 A | 1/1980 | Ball |
| 4,184,297 A | 1/1980 | Cassamayor |
| 4,189,880 A | 2/1980 | Ballin |
| 4,191,169 A | 3/1980 | Hyman |
| 4,242,386 A | 12/1980 | Weinlich |
| 4,242,414 A | 12/1980 | Mc Kenzie |
| 4,335,166 A | 6/1982 | Lizardo et al. |
| 4,358,488 A | 11/1982 | Dunklin et al. |
| 4,363,192 A | 12/1982 | Soucy |
| 4,380,140 A | 4/1983 | Abbott |
| 4,408,650 A | 10/1983 | Verch |
| 4,473,980 A | 10/1984 | Foster |
| 4,494,342 A | 1/1985 | Decker |
| 4,502,522 A | 3/1985 | Liljendahl |
| 4,543,755 A | 10/1985 | Crandell |
| 4,559,732 A | 12/1985 | Levy et al. |
| 4,569,872 A | 2/1986 | Chapman et al. |
| 4,649,681 A | 3/1987 | Eisele et al. |
| 4,706,729 A | 11/1987 | Sixsmith |
| 4,724,186 A | 2/1988 | Kelch |
| 4,749,222 A | 6/1988 | Inland |
| 4,831,799 A | 5/1989 | Glover et al. |
| 4,893,667 A | 1/1990 | Dunn |
| 4,911,964 A | 3/1990 | Carrozza et al. |
| 4,948,672 A | 8/1990 | Cartier |
| 4,975,307 A | 12/1990 | Sollogoub |
| 4,994,309 A | 2/1991 | Glover et al. |
| 5,007,217 A | 4/1991 | Glover et al. |
| 5,074,592 A | 12/1991 | White |
| 5,104,210 A | 4/1992 | Tokas |
| 5,107,643 A | 4/1992 | Swensen |
| 5,117,891 A | 6/1992 | Simon |
| 5,140,768 A | 8/1992 | Forbes |
| 5,161,827 A | 11/1992 | Grosso |
| 5,197,243 A | 3/1993 | Mozawa et al. |
| 5,258,214 A | 11/1993 | Cooledge et al. |
| 5,271,994 A | 12/1993 | Termath |
| 5,322,708 A | 6/1994 | Eissele |
| 5,426,897 A | 6/1995 | Gazaway |
| 5,506,037 A | 4/1996 | Termath |
| 5,629,365 A | 5/1997 | Razavi |
| 5,712,332 A | 1/1998 | Kaieda et al. |
| 5,749,994 A | 5/1998 | Sundet |
| 5,873,975 A | 2/1999 | Benoit |
| 5,875,282 A | 2/1999 | Jordan et al. |
| 5,887,369 A | 3/1999 | Danielczak |

(Continued)

FOREIGN PATENT DOCUMENTS

AU     2004100943 A4    9/2004

(Continued)

OTHER PUBLICATIONS

U.S. Appl. No. 11/618,015, "Window Film Assembly for Installation Over Windows and Methods" by Robert Reuter filed Dec. 29, 2006.

(Continued)

*Primary Examiner*—David R Sample
*Assistant Examiner*—Lawrence D Ferguson
(74) *Attorney, Agent, or Firm*—Elizabeth A. Gallo

(57) ABSTRACT

An assembly, method, and kit particularly adapted for use in mounting a window film structure in spaced apart and juxtaposed relationship to a window of a window assembly.

10 Claims, 7 Drawing Sheets

U.S. PATENT DOCUMENTS

| | | | |
|---|---|---|---|
| 5,937,595 | A | 8/1999 | Miller |
| 5,937,596 | A | 8/1999 | Leeuwenburgh et al. |
| 5,937,611 | A | 8/1999 | Howes |
| 5,983,593 | A | 11/1999 | Carbary et al. |
| 5,992,107 | A | 11/1999 | Poirier |
| 6,040,061 | A | 3/2000 | Bland et al. |
| 6,082,545 | A | 7/2000 | Ford et al. |
| 6,090,451 | A | 7/2000 | Barth et al. |
| 6,166,852 | A | 12/2000 | Miro |
| 6,171,681 | B1 | 1/2001 | Freedman et al. |
| 6,197,419 | B1 | 3/2001 | Hyde et al. |
| 6,294,233 | B1 | 9/2001 | Barth et al. |
| 6,367,210 | B1 | 4/2002 | Trundle |
| 6,386,617 | B1 | 5/2002 | Kusuma et al. |
| 6,451,446 | B1 | 9/2002 | Regnier |
| 6,497,777 | B1 | 12/2002 | Huang |
| 6,594,957 | B1 | 7/2003 | Milburn |
| 6,627,017 | B2 | 9/2003 | Simpson |
| 6,811,841 | B1 * | 11/2004 | Castiglione et al. ........... 428/34 |
| 6,931,799 | B2 | 8/2005 | Webb |
| 2003/0138243 | A1 | 7/2003 | Son |
| 2004/0035082 | A1 | 2/2004 | Hudoba et al. |
| 2004/0040652 | A1 | 3/2004 | Bharti et al. |
| 2004/0101647 | A1 | 5/2004 | Pitzen |
| 2005/0081993 | A1 | 4/2005 | Ilkka et al. |
| 2005/0178499 | A1 | 8/2005 | Bharti |
| 2006/0048403 | A1 | 3/2006 | Brister |
| 2006/0251888 | A1 | 11/2006 | Bamborough et al. |
| 2008/0155910 | A1 * | 7/2008 | Reuter .......................... 52/203 |
| 2008/0155911 | A1 * | 7/2008 | Reuter .......................... 52/203 |

FOREIGN PATENT DOCUMENTS

| | | |
|---|---|---|
| BE | 859381 A | 4/1978 |
| BE | 881198 A | 5/1980 |
| CA | 2254457 A1 | 11/1998 |
| CH | 671373 A1 | 8/1989 |
| DE | 1704237 A | 5/1967 |
| DE | 27 53 127 | 11/1977 |
| DE | 2621251 A | 11/1977 |
| DE | 3042838 A1 | 6/1982 |
| DE | 3110492 A1 | 1/1983 |
| DE | 3832770 A1 | 11/1990 |
| DE | 4310722 A1 | 10/1994 |
| DE | 29919653 A1 | 3/2000 |
| DE | 10054478 A1 | 5/2001 |
| EP | 69532 A2 | 1/1983 |
| EP | 591055 A2 | 4/1994 |
| EP | 607031 A1 | 7/1994 |
| EP | 1719809 A2 | 11/2006 |
| FR | 2476733 A | 8/1981 |
| FR | 2517811 A | 6/1983 |
| FR | 2546958 A | 12/1984 |
| FR | 2552368 A | 3/1985 |
| FR | 2573469 A | 5/1986 |
| FR | 2672693 A1 | 8/1992 |
| GB | 2011985 A | 7/1979 |
| GB | 2031497 A | 4/1980 |
| GB | 1567983 | 5/1980 |
| GB | 2033947 A | 5/1980 |
| GB | 2042038 A | 9/1980 |
| GB | 2044334 A | 10/1980 |
| GB | 2262938 A | 7/1983 |
| GB | 2135371 A | 8/1984 |
| GB | 2217256 A | 10/1989 |
| GB | 2231551 A | 11/1990 |
| GB | 2374893 A | 10/2002 |
| JP | 58-39452 | 8/1983 |
| JP | 2185430 A | 1/1989 |
| JP | 1047479 A | 2/1989 |
| JP | 2208630 A | 8/1990 |
| JP | 5008341 A | 1/1993 |
| JP | 2555619 A | 9/1996 |
| JP | 10182194 A | 7/1998 |
| JP | 10266733 A | 10/1998 |
| JP | 200265747 A | 9/2000 |
| JP | 2001192242 A | 7/2001 |
| JP | 2002053824 A | 2/2002 |
| JP | 2003039603 A | 2/2003 |
| JP | 2003112391 A | 4/2003 |
| JP | 2004076545 A | 3/2004 |
| JP | 2004099759 A | 4/2004 |
| JP | 2004241718 A | 8/2004 |
| KR | 2001000380 A | 1/2001 |
| MX | 2001006813 A1 | 10/2004 |
| RU | 2214373 C1 | 10/2003 |
| WO | 9013052 A | 11/1990 |
| WO | WO 9103381 A | 3/1991 |
| WO | WO 9852749 A1 | 11/1998 |
| WO | WO 9859143 A1 | 12/1998 |

OTHER PUBLICATIONS

U.S. Appl. No. 11/618,033, "Apparatus for Mounting Film Structures and Method" by Robert Reuter filed Dec. 29, 2006.

U.S. Appl. No. 11/618,050, "Window Film Assembly and Method of Installation" by Robert Reuter filed Dec. 29, 2006.

Brand, Bob, "Window Tint Installation," DodgeRam.org/Main/Tech Index/Window Tint, Last Updated Mar. 1, 1998.

Instructions, "Car Tinting Instructions," TintDude.com from archive. org, Dec. 23, 2005.

* cited by examiner

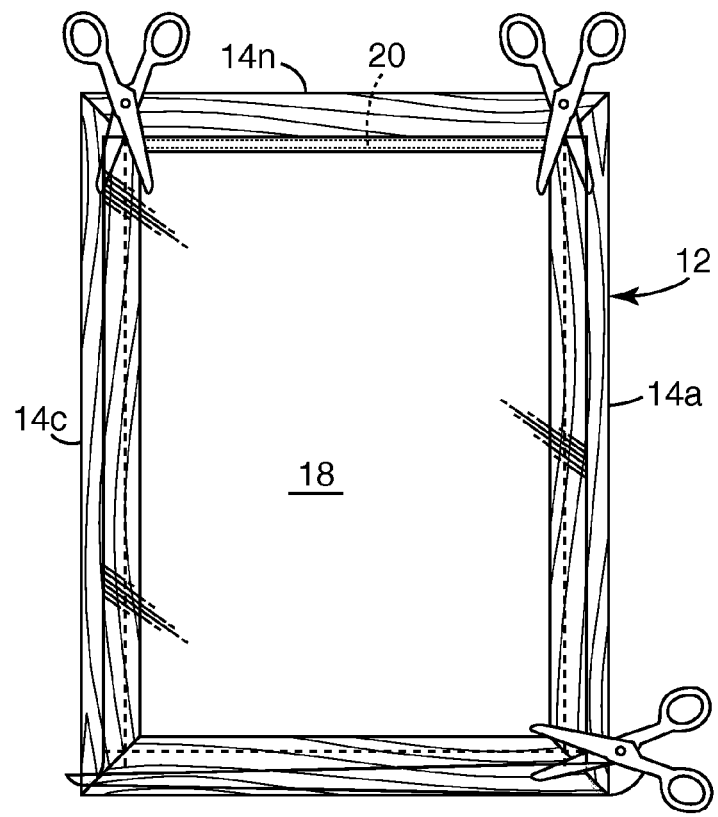
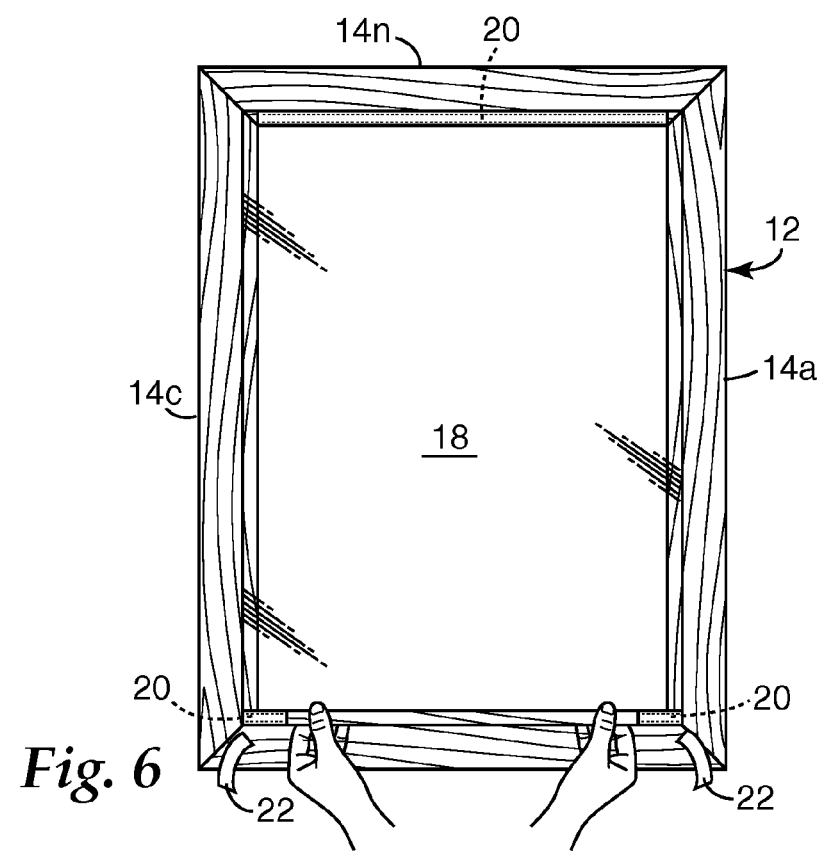

WINDOW FILM ASSEMBLY AND METHOD OF INSTALLING

CROSS REFERENCE TO RELATED APPLICATIONS

The present application is related to co-pending and commonly assigned U.S. patent applications: application Ser. No. 11/618,015, entitled "Window Film Frame Assemblies For Installation Over Windows And Methods"; U.S. patent application Ser. No. 11/618,033 entitled "Apparatus For Mounting Film Structures And Methods"; U.S. patent application Ser. No. 11/618,050 entitled "Apparatus For Mounting Laminates On Substrates And Methods Thereof"; all of which are filed concurrently herewith.

BACKGROUND

The present invention relates generally to methods, apparatus, and a kit for installing window film structures in combination with window film assemblies or the like. More particularly, it relates to methods, apparatus, and a kit for easily and reliably installing window film structures in a manner for avoiding formation of permanent film flaws therein diminishing their optical properties, while at the same time may enhance thermal insulation for associated window assemblies.

Window films are generally transparent plastic and/or metallized laminates applied as a thin layer to transparent panels, such as glass windows. Window films are available in many different compositions for bringing about varying effects on the optical and mechanical properties of the underlying transparent panels. Window films can reduce energy costs by minimizing the amount of heat entering a building through sunlight, thereby decreasing the amount of energy needed to cool the building. Window films also act as a filter for reflecting most ultraviolet and infrared wavelengths while allowing passage of visible light. This can result in substantial reductions in cooling costs. As noted, such films reduce the amount of ultraviolet entering a window, and are also often applied to reduce fading of the contents of a room. Other kinds of thin window films include security films applied to prevent glass from shattering, as well privacy films for controlling the visible light transmitted for effecting privacy purposes.

It will be appreciated that several factors are considered in selecting the correct film to be installed. Such factors include visible light transmission, properties of solar energy to be reflected, and decorative considerations, such as distortion free viewing following installation.

Because window films are usually installed by applying them to either or both surfaces of flat finished glass, the resulting laminates are less costly than buying chemically altered specialty glass for bringing about the same desired solutions. Because window films provide energy savings and help protect furnishings among other advantages, they are generally considered to be an investment that helps pay for itself. As such, they have gained widespread commercial acceptance.

Unless the window films are properly applied to windows, there is a chance that they will crease and fold, during cutting and installation due to their inherent highly flexible nature. Due to the inherent mechanical and chemical properties of these films, their installation can be tedious and subject to several shortcomings particularly in a do-it-yourself context. Generally, window films are thin and may be difficult to handle, especially if large window panels are to be laminated. For example, window films are relatively thin, such as up to 4 mils. These thin films have a tendency to fold upon themselves. Measuring and cutting thin films to the correct size before they are directly applied is particularly difficult, especially if irregular window shapes are involved and installation is performed by non-professionals, such as a do-it-yourself installer. Additionally, most window films are covered by a release sheet that must be removed before application of the film on the window. However, there is a strong tendency for the thin adhesive covered film surface to permanently wrinkle, crumple, or crease as the release sheet is manually removed. Accordingly, these film surfaces may stick to themselves even before the release sheet is completely removed. Creasing, wrinkling, etc. may cause permanent film flaws eventually that lead to discarding the films. Moreover, there is a chance that they will cause permanent flaws in the film which diminish their optical properties. Some of these window films include ultraviolet (UV) blocking materials that may in certain circumstance even damage the underlying window to which they are applied. As such, it is desired to avoid having the UV blocking film contact the window directly.

Also, such window film sheet structures are typically provided with an adhesive layer. The adhesive layer is exposed following removal of a low adhesion release liner and mounted to a window casement or the like. As noted, cutting and installing such thin films tends to be problematic due to their very flexible nature not to mention the adhesive layer sticking to itself in the process. As such, adhesives tend to further limit their uses, especially in do-it-yourself applications.

Attempts have been made to space transparent films from windows in order to improve the R-value associated with the windows. An R-value is a rating utilized to measure how well insulation can resist heat flow. The higher the R-value, the greater the insulating properties. However, while window films are beneficial they have not necessarily been successfully adapted for use in installation over transparent panels, such as windows. In part, this is due to the films being very thin, such as in the order of about 1 mil to about 4 mil. Typically, when applied to a frame for mounting the same, they cannot be kept planar over a frame opening. This is due primarily to their very flexible nature (i.e., they cannot sustain their dimensions). Accordingly, physical distortions of the films may arise and their optical properties are compromised. Because these films tend to be heat shrinkable, one typical approach for addressing their very flexible nature is to apply heat locally on the film. This is usually done by a hair dryer, heat gun, or other similar device. Heating causes the film to shrink over the frame opening, whereby it assumes a taught and generally planar orientation. As such, visual distortions thru the film are minimized and the appearance of the film over the window appears decorative. However, when heat is applied, it is usually done after the film has been applied to the frame and the film has reached room temperature of its operating environment. In some cases, heat is applied up to 24 hours after the film has been mounted on a frame. Clearly, this additional labor and time inhibit the ability for quickly and reliably mounting window film sheet structures to frames in many situations.

Also, direct application of the adhesive layers to window casements or the like inhibits reuse from heating season to heating season since the adhesive qualities tend to diminish through repeated usage. In addition, if window films are directly attached to windows, they are difficult to remove.

Thus, due to the number and complexity of steps involved in installing inherently very flexible film, along with the adhesive issues associated with installing thin window films, the prior approaches are generally considered time consuming, demanding, as well as potentially costly. These burdens are even more pronounced particularly in the do-it-yourself field, wherein a typical installer has very little experience handling these materials.

Without the foregoing issues being satisfied, the true potential of successfully applying and using window film sheet structures in a manner that: avoids optical distortions due to their very flexible and adhesive qualities causing permanent film flaws; and, promotes thermal insulation during repeated heating seasons may not be fully achieved, especially in a simple, reliable, less time consuming and less costly manner.

SUMMARY

The present invention provides enhanced methods, apparatus, and a kit including a window film assembly in combination with an assembly defining an opening around a window for installing transparent panels, such as windows in a manner representing improvements over prior art approaches.

The present invention relates generally to frame assemblies carrying films and, more particularly, to modular frame assemblies adapted for spacing window film sheet structures relative to windows of window assemblies as well as maintaining their optical properties.

The present invention provides a window film assembly in combination with an assembly defining an opening around a transparent panel, the combination comprises: a window film sheet structure covering the transparent panel and having lateral edges extending beyond the opening; one or more pressure-sensitive adhesive portions on at least the assembly around the opening and attached to the window film sheet structure; and one or more trim strip elements adhesively secured to the assembly for covering the lateral edges and the one or more pressure-sensitive adhesive portions.

The present invention also provides a film sheet structure including non-adhesive exterior major surfaces. The present invention also provides a film sheet structure that is selected from a group that comprises: solar window film, privacy window film, anti-graffiti window film, security window film, graphic design window film, frosted finish window film, and any combination thereof.

The present invention also provides the one or more trim strip elements, wherein each has one side provided with a pressure-sensitive adhesive portion, and an opposing side thereof having an exterior surface for enhancing the decorative appearance of the trim strip element.

The present invention provides a method of assembling a window film assembly in combination with an assembly defining an opening around a transparent panel. The method comprises: providing a window film sheet structure covering the transparent panel and having lateral edges extendable beyond the opening; applying one or more pressure-sensitive adhesive portions on at least the assembly around the opening; attaching the window film sheet structure to the one or more pressure-sensitive adhesive portions in covering relationship to the opening; and adhesively securing one or more trim strip elements to the assembly so as to cover the lateral edges and the one or more pressure-sensitive adhesive portions.

The present invention also provides a film sheet structure including non-adhesive exterior major surfaces.

The present invention also provides a film sheet structure that is selected from a group that comprises: solar window film, privacy window film, anti-graffiti window film, security window film, graphic design window film, frosted finish window film, and any combination thereof.

The present invention also provides a method wherein the one or more trim strip elements provided has one side provided with a pressure-sensitive adhesive portion, and an opposing side provided with an exterior surface for enhancing the decorative appearance of the trim strip elements.

An aspect of the invention is the provision of method, apparatus, and kit for providing a modular frame assembly using window film sheet structure adapted for installation over a transparent panel assembly.

An aspect of the present invention is a method, apparatus, and kit adaptable to use window film sheet structures to achieve the foregoing in a manner that minimizes significantly distortion of images viewable therethrough.

An aspect of the present invention is a method, apparatus, and kit adaptable to use window film sheet structures for installation over transparent panels as well as maintaining optical properties of the window film sheet structures.

An aspect of the present invention is a method, apparatus, and kit that achieve the foregoing in a manner that minimizes significantly the costs and labor associated with making such modular frame structures perform as noted.

Another aspect of the present invention is a method, apparatus, and kit that achieve the foregoing in a manner that increases significantly the reliability and ease of installing, such as window film sheet structures particularly, in a do-it-yourself environment.

An aspect of the present invention is a method, apparatus, and kit that achieve the foregoing in a manner that obtains the benefits of installation over transparent panel assemblies by using window film sheet structures that do not require adhesives.

The aspects described herein are merely a few of the several that can be achieved by using the present invention. The foregoing descriptions thereof do not suggest that the invention must only be utilized in a specific manner to attain the foregoing aspects.

These and other features and aspects of one aspect of this invention will be more fully understood from the following detailed description of the preferred embodiments. It should be understood that the foregoing generalized description and the following detailed description are exemplary and are not restrictive of the invention.

BRIEF DESCRIPTION OF THE DRAWINGS

FIG. 5 is a schematic view of cutting the window film sheet structure to a preselected size.

FIG. 6 is a schematic view of a window film sheet structure being mounted on the window assembly.

DETAILED DESCRIPTION

Figure 1:
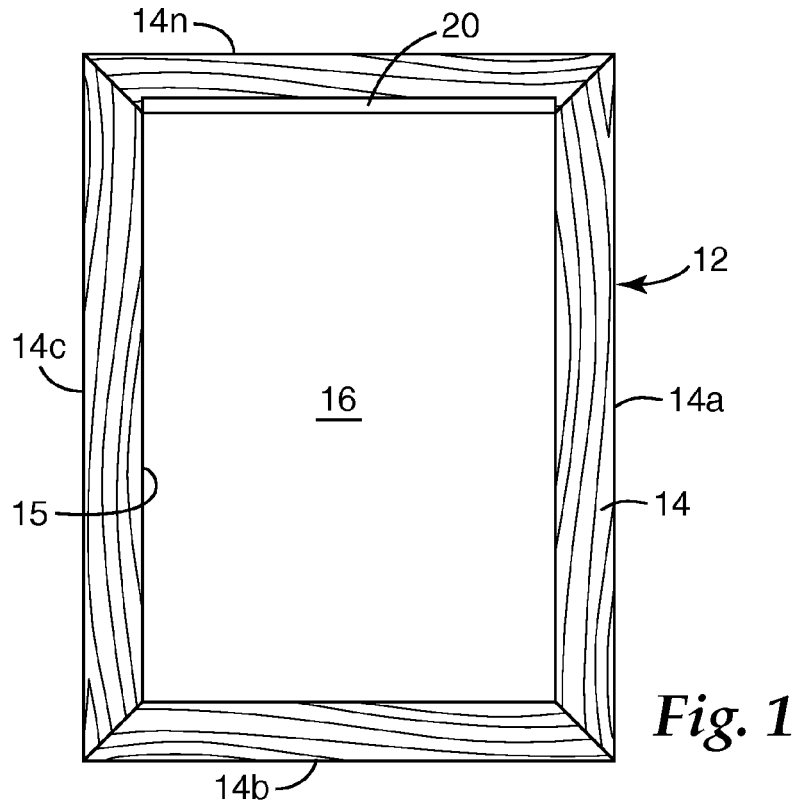
FIG. 1 is a schematic view of a window assembly that is to be treated in accordance with an aspect of the present invention.
Figure 10:
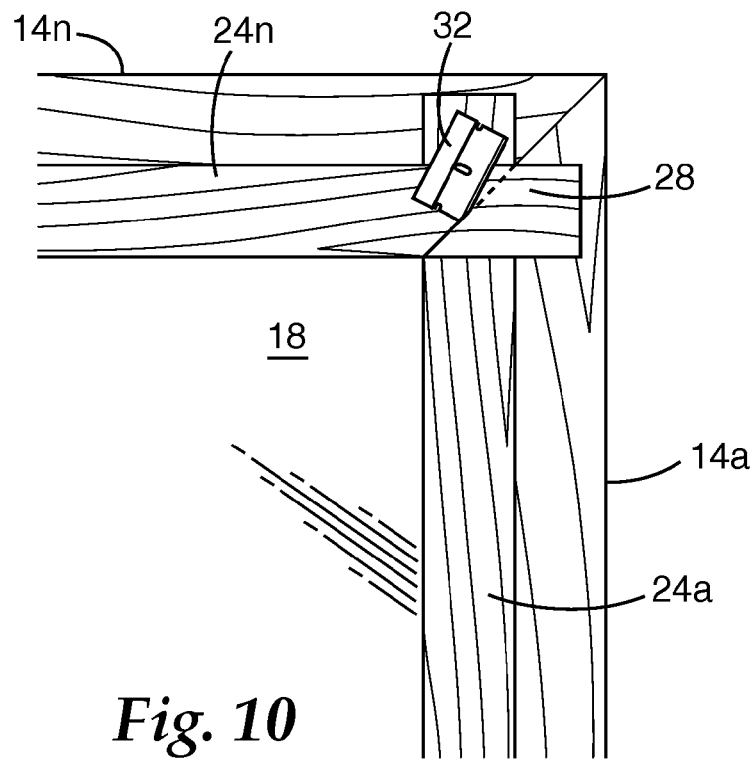
FIG. 10 is a schematic view of cutting of the corner of the overlapped trim strip elements.
Figure 11:
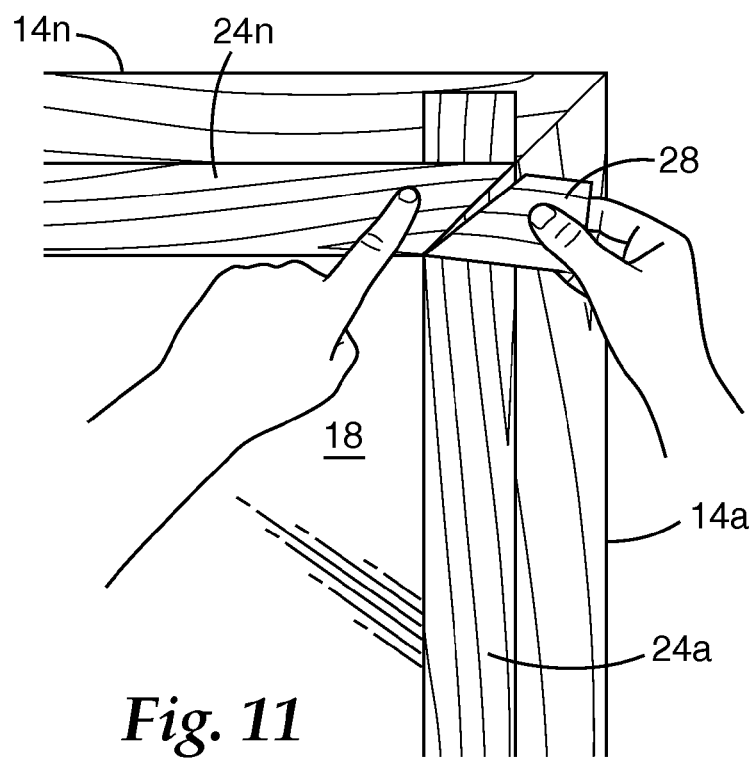
FIG. 11 is a schematic view of removing cut corner pieces of the overlapped trims strips.
Figure 12:
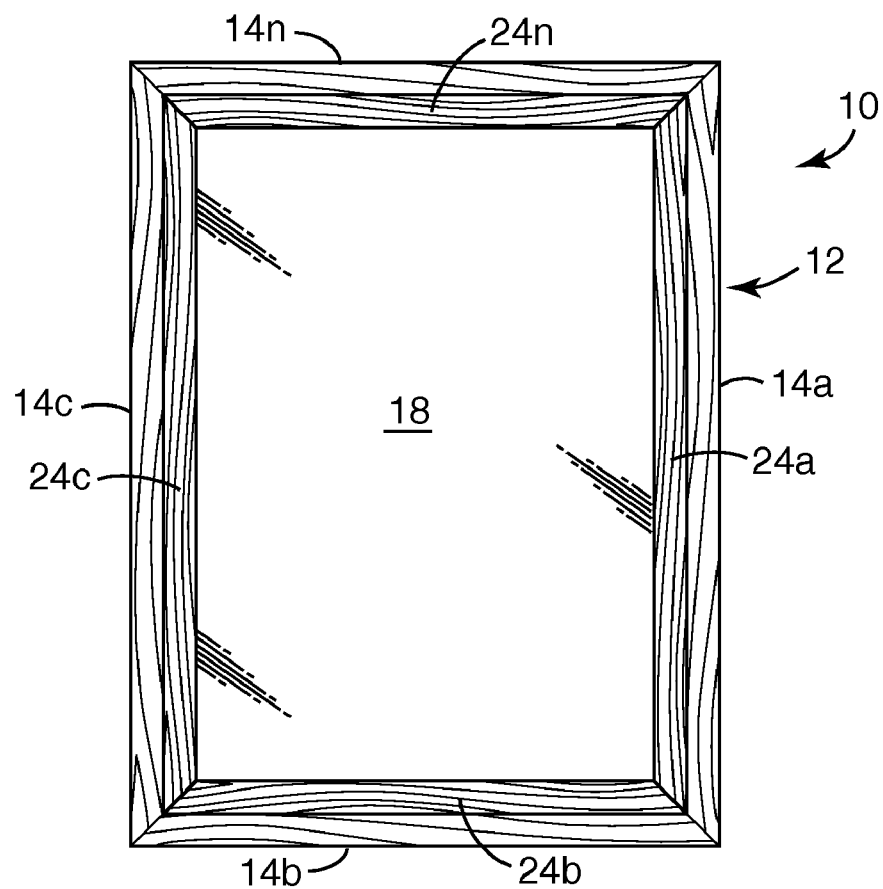
FIG. 12 is a schematic view of a window assembly that has been finished by following one aspect of the present invention.

FIGS. 1-12 illustrate one embodiment of making and installing a window film assembly 10 (FIG. 12) made according to one aspect of this invention. Referring to FIGS. 1 & 12, the window film assembly is adapted to be placed in spaced apart and juxtaposed relationship to a window assembly 12. In this embodiment, the window assembly 12 includes a window frame 14. The window frame 14 is comprised of window frame elements 14a-n (collectively, 14) that define an opening 15 and enclose a transparent panel 16 or window 16. While this embodiment is discussed in the context of a window assembly 12, as illustrated, it will be understood that the present invention envisions other kinds of window assemblies. It also envisions it use in combination with a variety of other structures, such as doors, panels, etc.

Figure 2:
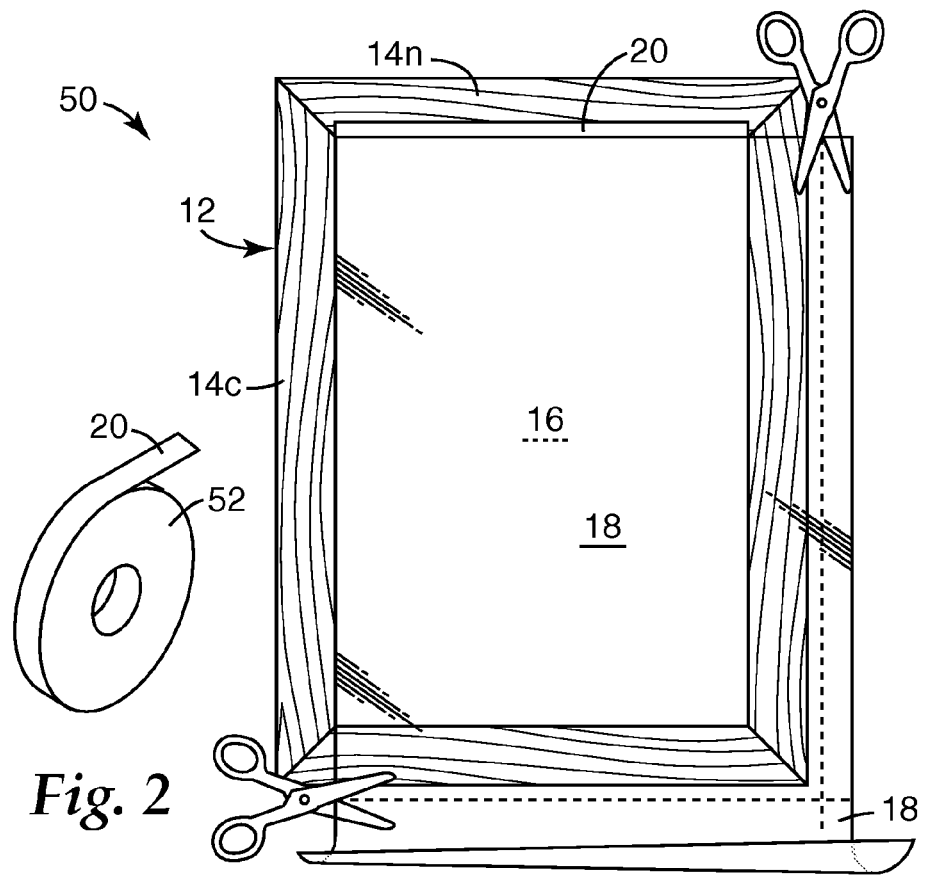
FIG. 2 is a schematic view of a window assembly that has a window film sheet structure placed over it and the sheet structure is illustrated as being in the process of being measured and cut.

Referring to FIG. 2, a window film sheet structure 18 is placed over the window 16. Prior to placing the window film sheet structure 18 over the window, an installer attaches an elongated pressure-sensitive adhesive stripe 20 (FIG. 1) along the bottom edge of a top window frame element 14n. It will be understood that the pressure-sensitive adhesive may include removable and permanent adhesives. The invention also envisions other suitable kinds of adhesive systems. An installer supports the window film sheet structure 18 on the top window frame element 14n and then measures and cuts the sheet structure. An installer will cut the window film sheet structure 18 with a pair of scissors or the like so that is oversized (e.g., about 2 inches in terms of length or width relative to the window frame 14.

Figure 3:
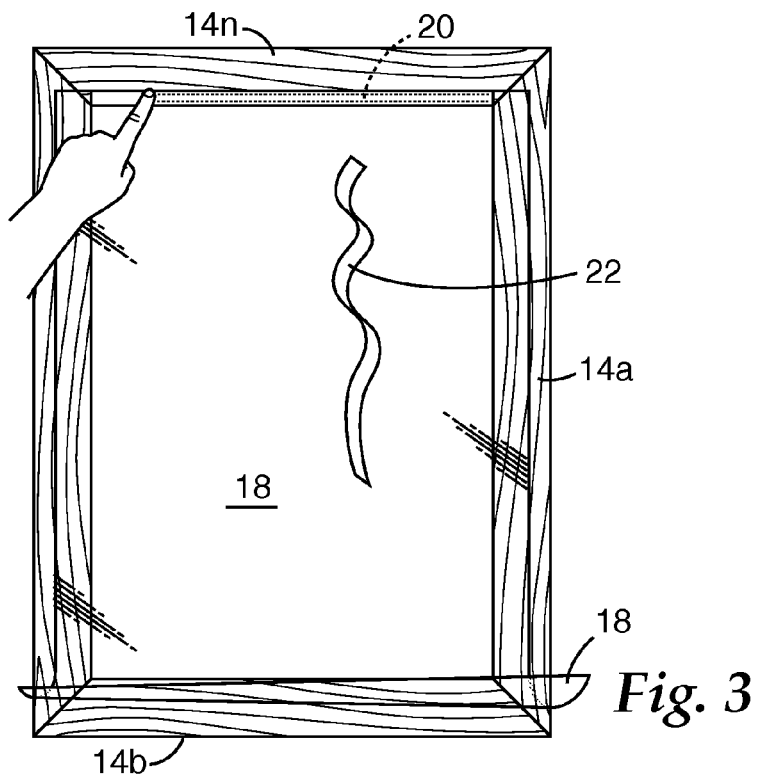
FIG. 3 is a schematic view of a window film sheet structure being mounted on a window assembly.

Referring to FIG. 3, an installer adheres the top of the cut window sheet film structure 18 so that it just covers the pressure sensitive tape 20. Prior to adhering the window sheet film structure 18 to the pressure sensitive tape 20, a release liner 22 of the latter is removed. In this process, the installer may center the film structure 18 relative to the window frame 14.

Figure 4:
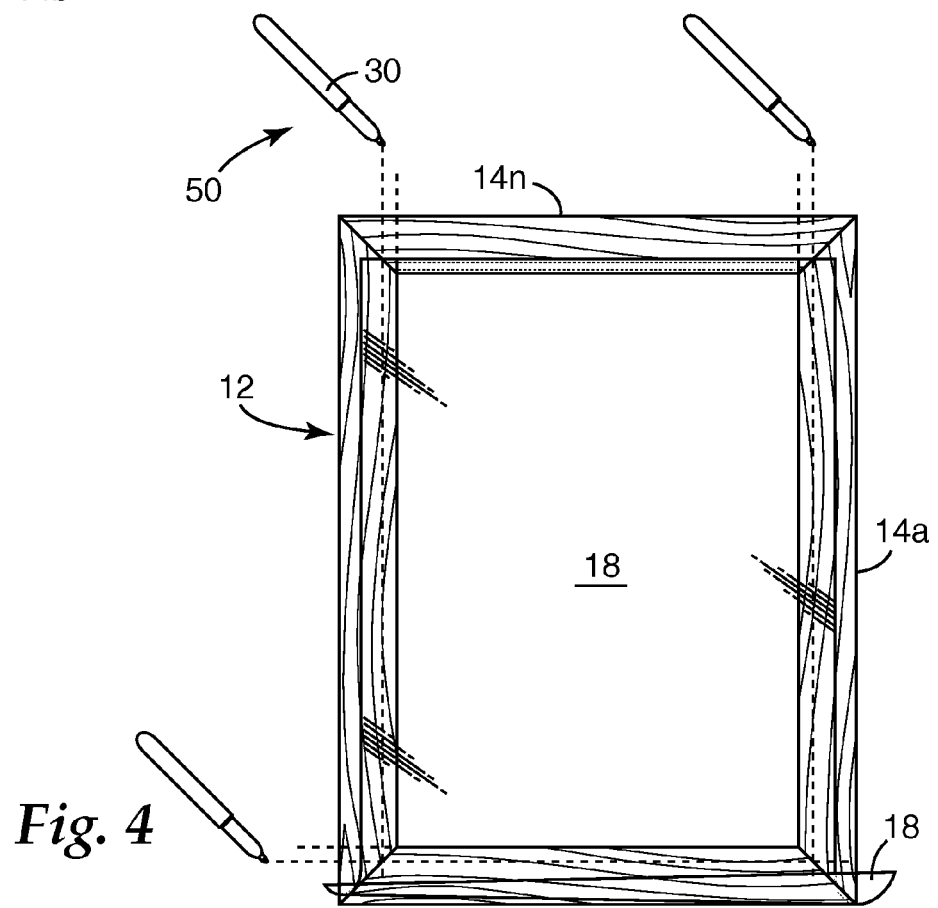
FIG. 4 is a schematic view of a window film sheet structure being marked on the window assembly.

Referring to FIG. 4, it is illustrated that in installer may then measure and mark the window sheet film structure 18 by a marker 30 to more closely contour it so that it overlaps the window frame elements to the same extent as on the top. Stated differently, in this embodiment the amount of overlap of all other sides of the window sheet film structure 18 is consistent with the overlap on the top. This overlap may be determined by the width of the pressure-sensitive adhesive stripe 20 on the top frame element 14n. In this embodiment, the degree of overlap is about one-half (½) inch. This presents a more decorative appearance that may match the appearance of the window frame assembly.

As illustrated in FIG. 5, an installer can use scissors or some other cutting tool for cutting along the marked lines. Thereafter as shown in FIG. 6, the window sheet film structure 18 is mounted on the window frame 14. In this embodiment, the installer may add relatively short pressure-sensitive adhesive stripes 20 on the bottom edge near each corner. The installer may apply tension to the window sheet film structure 18 so that it is as planar as possible. As a result, the corner pressure-sensitive adhesive stripes 20 are attachable to bottom corners of the frame assembly. Then an installer may remove the release liners 22 from each of the corresponding pressure-sensitive adhesive stripes 20.

Figure 7A:
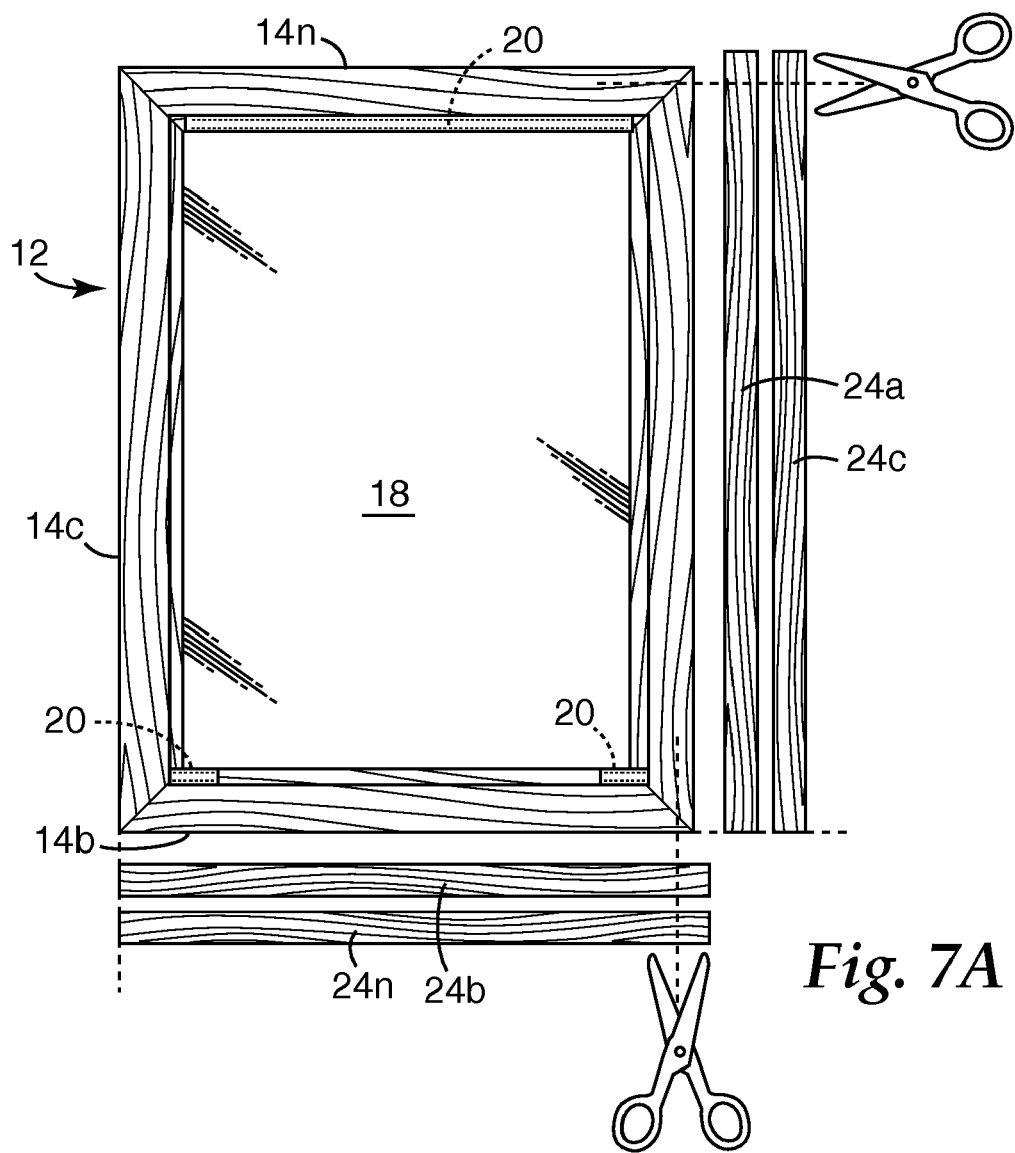
FIG. 7A is a schematic view of a window assembly having the window film sheet structure mounted thereon and in combination with a plurality of trim strip elements that are to be cut to a predetermined length.
Figure 7B:
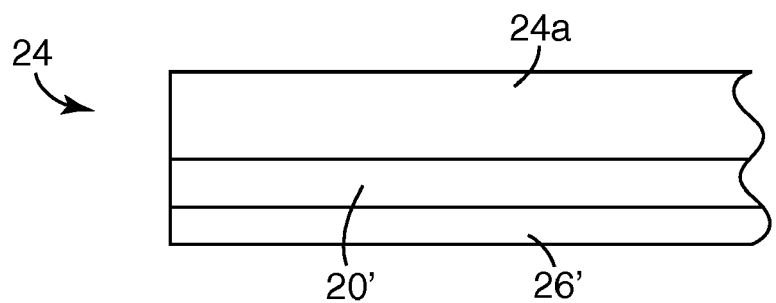
FIG. 7B is an enlarged schematic end view of a trim strip element.

Reference is now made to FIG. 7A, wherein there is illustrated a plurality of finishing trim elements or strips $24_{a-n}$ (collectively, 24) that are measured and cut. As illustrated, the trim elements 24a and 24c are cut at least as long as the vertical frame elements 14a and 14c. The horizontal trim elements 24b and 24n are cut at least as long as the horizontal frame elements 14b and 14n. In this embodiment, the trim strip elements 24 are generally elongated and thin. One side of each trim strip element 24 is adapted to adhesively engage the window frame elements 14. In this embodiment, a single-sided pressure-sensitive adhesive stripe 20' (see FIG. 7B) is used. Other kinds of adhesives are contemplated as well as other mechanisms for attachment are envisioned. The single-sided pressure-sensitive adhesive stripe 20' is provided with a release liner 26. The trim strip elements 24 have their opposing surfaces 24a provided with a wood grain appearance that may match the surface of the window frame. Such a surface may provide other appearances as well. Typically, the trim strip elements 24 are made of a suitable vinyl material or the like and have a thickness in a range of about 2 mil to at least about 10 mil. More typically, the trim strip element 24 may be commercially available from 3M Company, St. Paul, Minn. Other suitable kinds of trim strip elements are contemplated by this invention.

Figure 13:
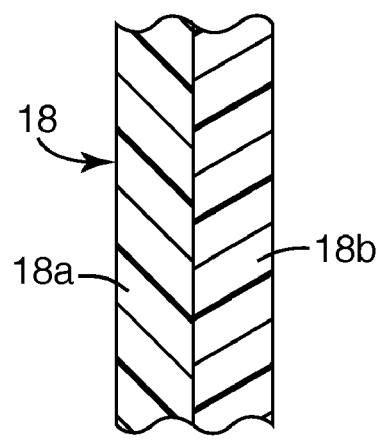
FIG. 13 is a schematic view of a cross-section of a window film structure.

Reference is made to FIG. 13 for illustrating one embodiment of the window film sheet structure 18. The window film sheet structure 18 may be a transparent plastic material that is flexible and yet has sufficient stiffness so that it can retain its dimensions and shape when mounted. In addition, the window film sheet structure 18 is to have its major exterior surfaces without an adhesive layer. There are a number of approaches for attaining such constructions within the spirit and scope of this invention.

In one illustrated embodiment, the window film sheet structure 18 is a window film structure that includes a clear liner 18a joined to a film base structure 18b through a pressure-sensitive adhesive layer (not shown). While the window film sheet structure 18 noted typically has its clear liner removed, this invention envisions not removing such so as to thereby impart stiffness to the film sheet structure. In this manner, the window film sheet structure 18 will retain its planar relationship and avoid being too flimsy and creasing so as to cause permanent flaws therein. Instead of removing the clear liner 18a, it will remain with the base structure 18b. Accordingly, the film will have a thickness in a range that will provide the requisite stiffness. This window film sheet structure 18 may be of the solar window film type. The clear liner 18a can be made of a suitable polyester or vinyl material or the like and the film base structure 18b can be made of a suitable polypropylene or polyethylene material. Other suitable materials can be used, for the base structure and the clear liner, such as suitable sheet polymers or the like. Whatever materials are used the collective thicknesses should be sufficiently thick for the window film sheet structure 18 to be flexible and yet stiff enough to hold its dimensions during use. One commercial version of such a film structure is Prestige® that is commercially available from 3M Company, St. Paul, Minn. This film structure has a base structure made of a polyester and adhesive layer (not shown) and a clear liner made of polyester or vinyl. Typically, the film structure has a thickness of in a range of about at least 5 mil. More typically, the film structure has a thickness in the range of about 5 mil to about 10 mil. Another version of window film that can be used is Scotch® Tint window film that is commercially available from 3M Company, St. Paul, Minn.

Another embodiment contemplates using a window film structure with an additional transparent layer that is added to a window film structure that may be too thin to provide stiffness of the kind described herein. In this regard, the additional layer serves to increase the thickness of the window film sheet structure so that the latter will obtain a desired stiffness level. The additional layer may be co-extruded with the window film base structure. The additional layer is essentially added to provide stiffness to the overall window film sheet structure. In this manner, the window film sheet structure will tend to retain its dimensions and planarity, such as when mounted to the film frame assembly. The additional layer is intended to primarily be a transparent material that does not possess any additional optical properties that affect the functioning of the window film sheet structure. Alternatively, the additional layer may be added thereto, in any suitable manner, materials that can alter the optical properties of the overall window film sheet structure.

Figure 8:
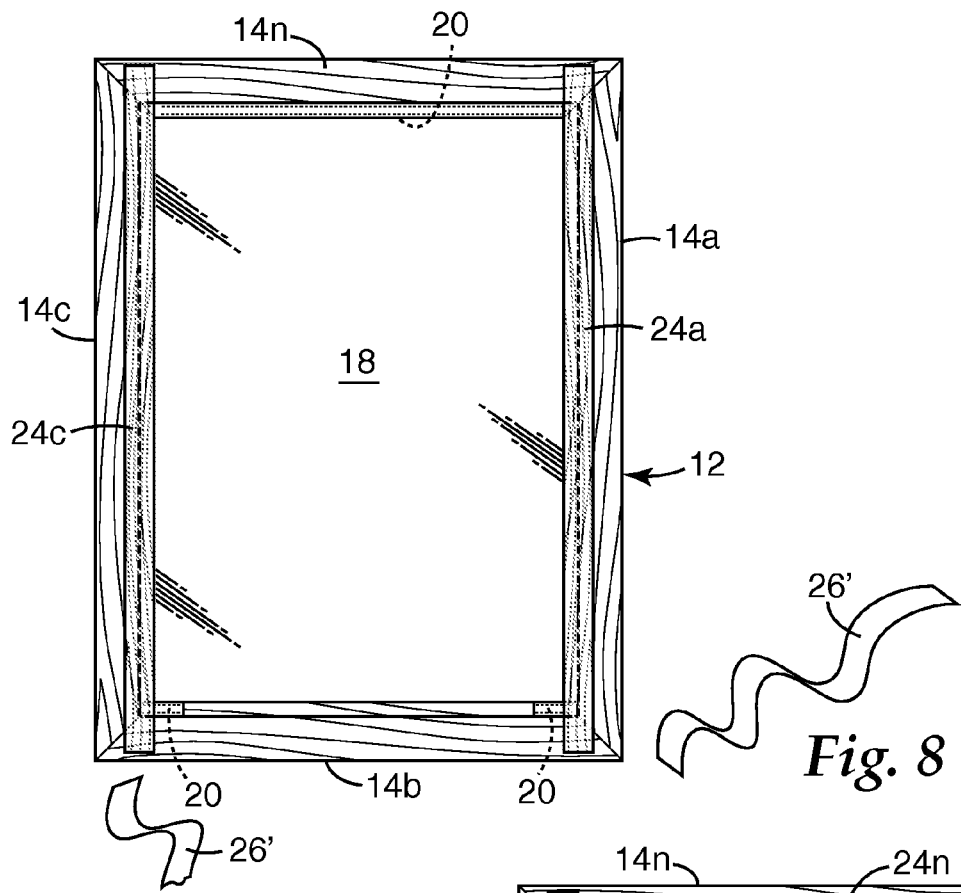
FIG. 8 is a schematic view of mounting a pair of vertical trim strip elements to the window assembly over lateral edges of the window film sheet structure.
Figure 9:
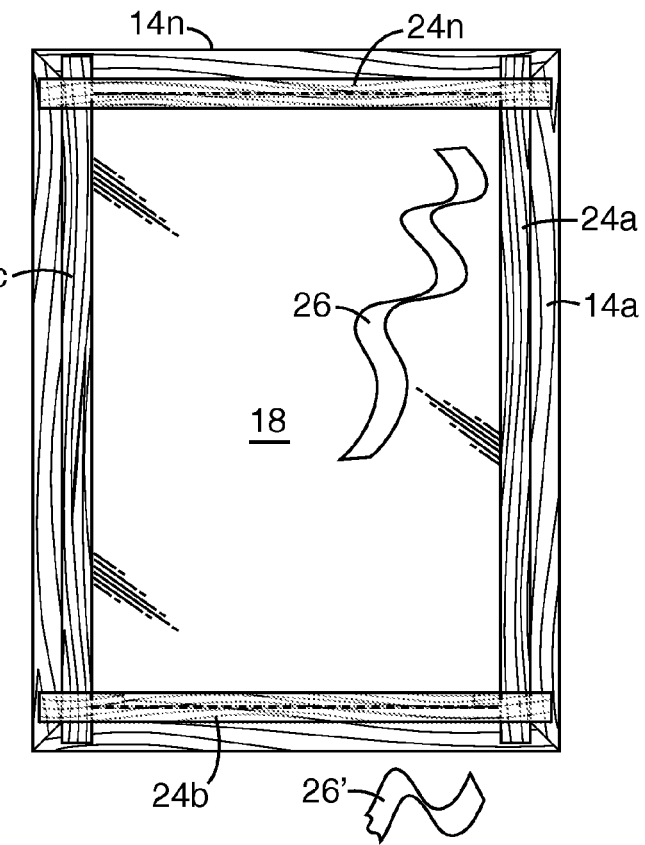
FIG. 9 is a schematic view of mounting a pair of horizontal trim strip elements to the window assembly over lateral edges of the window film sheet structure as well as overlapping end portions of the vertical trim strip elements.

Referring to FIG. 8, a pair of vertically oriented trim strip elements 24*a, c* is attached to the window assembly 14. In this embodiment, the trim strip elements 24 are relatively narrower than the frame elements 14. However, the broad aspects of this invention contemplating using trim strip element that are the same as or wider than the trim strip elements. In this regard, one edge of the trim strip element is placed along the edges of the vertical frame elements 14 *a, c* just beyond the lateral edges of the window sheet film structure 18. As such, the lateral edges should be completely covered and pressed against the frame elements. Prior to the trim strip elements 24 being adhesively secured, their release liners 26 are removed. At this juncture, there is no need to press the bottom corners against the frame assembly 14. Reference is now made to FIG. 9, wherein the horizontal trim strip elements 24*b* and 24*n* overlap the vertical trim strip elements 24*a* and 24*c*. The release liners 26 are removed to allow the horizontal strips 24 to be mounted in a like manner as the vertical strips, whereby they overlap the top and bottom edges of the window sheet film structure 18.

Reference is now made to FIG. 10 for illustrating an installer using a cutting tool 32, such as a razor 32 or the like. In this embodiment, the razor 32 may make a miter cut 28 through both the overlapping end portions of the trim strip elements at their respective corners. An installer may follow the miter cut of orthogonally abutting frame elements 14. FIG. 11 illustrates an installer removing the cut end pieces along the miter cut 28. Thereafter, the installer may then press down on the end portions of the trim strip elements. As a result, as illustrated in FIG. 12 there is provided a window film assembly 10, wherein the window sheet film structure 18 is spaced apart in juxtaposed relationship from the window and may provide for thermal insulation. Such an arrangement may enhance the R-value. As noted earlier, window sheet film structure 18 does not have its release liner removed as is normally done when using the film structure. Because the major surfaces of the window film sheet structure 18 does not have an adhesive surface, some of the issues associated with the use of adhesive surfaces are removed. In addition, given the simplicity of the foregoing method, a do-it-yourself installer would have little difficulty handling this film. Moreover, the foregoing aspects provide a highly reliable and simple approach for installing window film assemblies to windows without encountering some of the issues noted above.

Provision is made for a kit 50 (see FIGS. 2 & 4) containing components that facilitate an installer being able to customize a window film assembly 10 to a window assembly 12 having a wide variety of shapes and sizes. This kit 50 is particularly adapted to be utilized in the context of a do-it-yourself environment because of the ease and reliability of using it. In this regard, the kit 50 provides at least a sheet of the window film sheet structure 18; a roll 52 (FIG. 2) of pressure-sensitive adhesive tape 20 that is applicable for suitably joining an appropriate number of trim strip elements 24. The kit 50 may also include a marking tool 30 and a cutting tool (e.g., razor 32).

The words "a", "an", and "the" are used interchangeably with "at least one" to mean one or more of the elements being described. By using words of orientation, such as "top", "bottom", "overlying", "front", "back" and "backing" and the like for the location of various elements in the disclosed articles, we refer to the relative position of an element with respect to a horizontally-disposed body portion. It is not intended that the disclosed articles should have any particular orientation in space during or after their manufacture.

The above embodiments have been described as being accomplished in a particular sequence. It will be appreciated that such sequences of the operations may change and still remain within the scope of the invention. Also, other procedures may be added.

One aspect of this invention may take on various modifications and alterations without departing from the spirit and scope. Accordingly, one aspect of this invention is not limited to the above-described embodiments, but is to be controlled by limitations set forth in the following claims and any equivalents thereof.

One aspect of this invention also may be suitably practiced in the absence of any element not specifically disclosed herein. All patent and publications noted above, including any in the Background section are incorporated by reference into this document in total.

What is claimed is:

1. A window film assembly in combination with a window assembly comprising a window frame defining an opening around a transparent panel, the combination comprising: a window film sheet structure covering the transparent panel and having lateral edges extending beyond the opening; one or more pressure-sensitive adhesive portions on the window frame and attached to the window film sheet structure; and one or more trim strip elements adhesively secured to the window frame for covering the lateral edges of the window film sheet structure and the one or more pressure-sensitive adhesive portions, wherein the one or more trim strip elements have one side provided with a pressure-sensitive adhesive portion, and an opposing side provided with an exterior surface for enhancing the decorative appearance of the trim strip elements.

2. The combination of claim 1, wherein the window film sheet structure includes non-adhesive exterior major surfaces.

3. The combination of claim 2, wherein the window film sheet structure is selected from a group that comprises: solar window film, privacy window film, anti-graffiti window film, security window film, graphic design window film, frosted finish window film, and any combination thereof.

4. The combination of claim 3, wherein the window film sheet structure has a thickness in the order of about 5 mil to about 10 mil.

5. The window film assembly of claim 1, wherein the exterior surface of the one or more trim strip elements provides a wood grain appearance.

6. A kit for making a window film assembly in combination with a window assembly comprising a window frame defining an opening around a transparent panel, the kit comprising:
 a window film sheet structure that is oversized relative to the transparent panel to be covered and has its lateral edges extendable beyond the opening;
 one or more pressure-sensitive adhesive portions adapted to be mounted on at least the window frame and attachable to the window film sheet structure; and
 one or more trim strip elements adhesively securable to the window frame and adapted for covering the lateral edges of the window film sheet structure and the one or more pressure-sensitive adhesive portions, wherein the one or more trim strip elements have one side provided with a pressure-sensitive adhesive portion, and an opposing side provided with an exterior surface for enhancing the decorative appearance of the trim strip elements.

7. The kit of claim 6, wherein the window film sheet structure includes non-adhesive exterior surfaces.

8. The kit of claim 6, wherein the window film sheet structure is selected from a group that comprises: solar window film, privacy window film, anti-graffiti window film, security window film, graphic design window film, frosted finish window film, and any combination thereof.

9. The kit of claim 6, further comprising: a roll of pressure-sensitive adhesive tape that provides for the adhesive portions.

10. The kit of claim 6, wherein the exterior surface of the one or more trim strip elements provides a wood grain appearance.

* * * * *

UNITED STATES PATENT AND TRADEMARK OFFICE
CERTIFICATE OF CORRECTION

| | | |
|---|---|---|
| PATENT NO. | : 7,815,997 B2 | Page 1 of 1 |
| APPLICATION NO. | : 11/618001 | |
| DATED | : October 19, 2010 | |
| INVENTOR(S) | : Robert J Reuter | |

It is certified that error appears in the above-identified patent and that said Letters Patent is hereby corrected as shown below:

Title page, Column 2 (Abstract), Line 1 - Delete "method," and insert -- , --, therefor.

Column 1, Line 9 - After "11/618,015," insert -- (Attorney Docket No. 62688US002), --.

Column 1, Line 11 - After "11/618,033" insert -- (Attorney Docket No. 62689US002), --.

Column 1, Line 13 - After "11/618,050" insert -- (Attorney Docket No. 62690US002), --.

Column 4, Line 27 - After "particularly" delete ",".

Column 5, Line 35 - Delete "it" and insert -- its --, therefor.

Column 5, Line 58 - Delete "in" and insert -- an --, therefor.

Column 7, Line 28 - Delete "be" and insert -- have --, therefor.

Column 7, Line 35 - Delete "contemplating" and insert -- contemplate --, therefor.

Column 8, Line 43 - Delete "patent" and insert -- patents --, therefor.

Signed and Sealed this
Twenty-second Day of February, 2011

David J. Kappos
*Director of the United States Patent and Trademark Office*